(12) United States Patent
Zhuang et al.

(10) Patent No.: US 12,429,387 B2
(45) Date of Patent: Sep. 30, 2025

(54) PHOTOEXCITATION-FREE TEMPERATURE SENSING MATERIAL, PREPARATION METHOD AND TEMPERATURE SENSING METHOD

(71) Applicant: XIAMEN UNIVERSITY, Xiamen (CN)

(72) Inventors: Yixi Zhuang, Xiamen (CN); Changjian Chen, Xiamen (CN); Tianliang Zhou, Xiamen (CN); Rongjun Xie, Xiamen (CN)

(73) Assignee: XIAMEN UNIVERSITY, Xiamen (CN)

( * ) Notice: Subject to any disclaimer, the term of this patent is extended or adjusted under 35 U.S.C. 154(b) by 462 days.

(21) Appl. No.: 18/116,844

(22) Filed: Mar. 3, 2023

(65) Prior Publication Data

US 2023/0204437 A1    Jun. 29, 2023

Related U.S. Application Data

(63) Continuation of application No. PCT/CN2021/088949, filed on Apr. 22, 2021.

(30) Foreign Application Priority Data

Feb. 3, 2021    (CN) .......................... 202110146644.1

(51) Int. Cl.
*G01K 11/20*    (2006.01)
*C08K 3/30*    (2006.01)
(Continued)

(52) U.S. Cl.
CPC ............... *G01K 11/20* (2013.01); *C08K 3/30* (2013.01); *C09K 11/02* (2013.01);
(Continued)

(58) Field of Classification Search
CPC .... G01K 11/20; C08K 2003/162; C08K 3/30; C08K 2003/3036
See application file for complete search history.

(56) References Cited

U.S. PATENT DOCUMENTS

2018/0274987 A1*    9/2018    Stapleton ............... G01K 11/12
2024/0279545 A1*    8/2024    Gao ......................... G01K 11/20

FOREIGN PATENT DOCUMENTS

CN    102634335 A    8/2012
CN    109880617 A    6/2019
(Continued)

OTHER PUBLICATIONS

International Search Report issued in corresponding International application No. PCT/CN2021/088949, mailed Nov. 8, 2021.
(Continued)

*Primary Examiner* — Randy W Gibson (57) ABSTRACT

The present application provides a photoexcitation-free temperature sensing material, a preparation method, and a temperature sensing method. The photoexcitation-free temperature sensing material has a general chemical formula of $(Sr_xM_{1-x})_{1-y-z}ZnSO:Tb_y,Eu_z$, wherein $0 \leq x \leq 1$, $0<y<1$, $0<z<1$, and $y+z<1$; x, y, and z represent molar percentages; M represents a substitution ion of Sr and is one or two selected from $Ca^{2+}$ and $Ba^{2+}$.

10 Claims, 4 Drawing Sheets

(51) Int. Cl.
    *C09K 11/02*     (2006.01)
    *C09K 11/77*     (2006.01)
    *C08K 3/16*     (2006.01)

(52) U.S. Cl.
    CPC .... *C09K 11/7789* (2013.01); *C08K 2003/162* (2013.01); *C08K 2003/3036* (2013.01)

(56) References Cited

FOREIGN PATENT DOCUMENTS

| | | |
|---|---|---|
| CN | 110591701 A | 12/2019 |
| CN | 111909689 A | 11/2020 |

OTHER PUBLICATIONS

Written Opinion of the International Searching Authority for No. PCT/CN2021/088949.
Achieving Remote stress and Temperature Dual-Modal Imaging by Double-Lanthanide-Activated Mechanoluminescent Materials "Adv. Funct. Mater.", mailed Apr. 9, 2021, vol. 31, p. 2101567 (1-8).
Emission mechanism in single and co-doped Tb:Eu:CaZnOS "Journal of Alloys and Compounds", malled Feb. 6, 2021, vol. 868, p. 159007 (1-8).
Mechanically Excited Multicolor Luminescence in Lanthanide Ions "Adv. Mater", mailed Dec. 27, 2018, vol. 31, p. 1807062 (1-8).

* cited by examiner

PHOTOEXCITATION-FREE TEMPERATURE SENSING MATERIAL, PREPARATION METHOD AND TEMPERATURE SENSING METHOD

CROSS-REFERENCE TO RELATED PATENT APPLICATIONS

This application is a continuation-application of International Application No. PCT/CN2021/088949, with an international filing date of Apr. 22, 2021, which claims benefit from CN Application No. 202110146644.1, with a filing date of Feb. 3, 2021, the contents of all of which are hereby incorporated by reference.

TECHNICAL FIELD

The present application relates to a photoexcitation-free temperature sensing material, a preparation method, and a temperature sensing method, belonging to the technical field of temperature sensing materials.

BACKGROUND

Temperature is one of the most important parameters in industrial production and daily life. Precise and efficient temperature sensing is essential for implementing accurate and effective temperature measurement. At present, temperature sensing, according to different sensing mechanisms, mainly includes: (1) contact sensing, which is categorized into resistor-type temperature sensing based on resistance change, mercury-type temperature sensing based on volume change, capacitor-type temperature sensing based on capacitance change, and thermocouple-type temperature sensing based on thermoelectric potential change; and (2) non-contact sensing, which is categorized into thermal radiation-type temperature sensing based on material thermal radiation spectrum change and fluorescence ratio-type temperature sensing based on fluorescence spectrum change.

Specifically, the fluorescence ratio-type temperature sensing technology can determine the temperature of a sensing material by monitoring the fluorescence intensity ratio of two or more emission wavelengths within the fluorescence spectral range emitted from an object that is irradiated under the excitation of a light source. Such a fluorescence ratio-type temperature sensing technology possesses a series of advantages such as quick response, non-contact measurement, anti-electromagnetic interference, and resistance to extreme environments. For example, non-patent document 1 (Yuan Ning, Liu Dayu, Sun Hongxue, Zhang Delong, Temperature sensor based on down-conversion green fluorescence of erbium ion, Transactions of Tianjin University (Natural Science and Engineering), 2018, Vol. 51, No. 3: 325-330) reports a $SrGdGa_3O_7:Er^{3+}$ material which gives $^4S_{3/2} \rightarrow {}^4I_{15/2}$ (550 nm) and $^2H_{11/2} \rightarrow {}^4I_{15/2}$ (530 nm) green fluorescence of $Er^{3+}$ under the excitation at 488 nm, thus achieving optical temperature sensing based on the intensity ratio of the two fluorescence. Patent document 1 (Chen Daqin, Wan Zhongyi, Liu Shen, Zhou Yang, Double-activated ion-doped bi-crystalline phase glass ceramic fluorescent temperature probing material and preparation method thereof, CN105198225B) reports a double rare earth ion-doped glass ceramic fluorescent temperature probing material. The glass ceramic has the following components: 30-50 mol % of $SiO_2$; 15-30 mol % of $Al_2O_3$; 0-20 mol % of NaF; 0-20 mol % of LiF; 0-15 mol % of ZnO; 5-15 mol % of $ReF_3$; 5-20 mol % of $Ga_2O_3$; 0.001-2 mol % of $LnF_3$; and 0.001-2 mol % of TM compound, where Ln is the rare earth ion luminescence center; and TM is the transition metal ion luminescence center. Under the excitation of an ultraviolet light source, the luminous intensity ratio of the two activated ions in the glass ceramic is highly dependent on temperature, and thus the glass ceramic can be used as a self-calibrating fluorescent temperature sensing material. Patent document 2 (Cui Yuanjing, Yang Yu, Qian Guodong, Xu Hui, Yu Jiancan, Double rare earth metal-organic framework material for temperature detection and synthesis method thereof, CN102584873B) reports a double rare earth metal-organic framework material with a structural formula of $(Eu_xTb_{1-x})L_n$, where L is one of 2,5-dimethoxyterephthalic acid, 2,5-diethoxyterephthalic acid, 3,5-dimethoxyterephthalic acid, or 3,5-diethoxyterephthalic acid, $0<X\leq0.5$, and n=1-4. The synthesis of the material can be implemented by only conducting a solvothermal reaction on rare earth salt containing $Eu^{3+}$ and $Tb^{3+}$ and organic ligand L containing carboxylic acid groups, which involves a simple process and results in a high yield. The double rare earth metal-organic framework material has the characteristic luminescence peaks of $Eu^{3+}$ and $Tb^{3+}$ concurrently under the irradiation of ultraviolet light source, and the intensity ratio of the two luminescence peaks (613 nm and 545 nm) has a good linear relationship with temperature, thus realizing self-calibrating fluorescent temperature sensing.

It is thus clear that the existing fluorescence ratio-type temperature sensing methods and materials all need an external light source to excite the materials. In some scenes where an external light source cannot be used, such as those inside organisms, buildings, etc., the application of the above-mentioned fluorescence ratio-type temperature sensing method will be greatly limited. In addition, the use of an external excitation light source will produce strong background fluorescence, which may affect the sensing sensitivity. Furthermore, the external excitation light source also complicates the overall structure of a sensing device and increases the cost. Therefore, it is of great practical significance to develop a photoexcitation-free temperature sensing material and sensing method, which can improve the temperature sensing sensitivity, simplify the device structure, and expand the application range of temperature sensing methods.

SUMMARY

The embodiment of the present application provides a photoexcitation-free temperature sensing material, a preparation method for the photoexcitation-free temperature sensing material, and a temperature sensing method.

The present application is implemented as follows:

A photoexcitation-free temperature sensing material has a general chemical formula of $(Sr_xM_{1-x})_{1-y-z}ZnSO:Tb_y,Eu_z$, where $0\leq x\leq1$, $0<y<1$, $0<z<1$, and $y+z<1$; x, y, and z represent molar percentages; M represents a substitution ion of Sr and is one or two selected from $Ca^{2+}$ and $Ba^{2+}$.

As a further improvement, $0<y\leq0.1$ and $0<z\leq0.1$.

As a further improvement, the photoexcitation-free temperature sensing material is a mechanoluminescence material, and a ratio of a mechanoluminescence intensity in a waveband of 544 nm of the material to a mechanoluminescence intensity in a waveband of 625 nm of the material has an exponential function relationship with an ambient temperature.

A preparation method for the above-mentioned photoexcitation-free temperature sensing material, including following steps:

S1, selecting raw materials of compounds each containing one of element Sr, M, Zn, Tb, and Eu, weighing the raw materials according to a stoichiometric ratio of each of the element, adding a sintering flux $Li_2CO_3$, and thoroughly grinding to obtain a mixed raw material; wherein the stoichiometric ratio of each of the element refers to the stoichiometric ratio of each of the element in the general chemical formula of $(Sr_xM_{1-x})_{1-y-z}ZnSO:Tb_y,Eu_z$, $0 \leq x \leq 1$, $0 < y < 1$, $0 < z < 1$, $y+z < 1$, and x, y, and z represent a molar percentage;

S2, heating the mixed raw material to 800-1200° C. in an inert atmosphere or under vacuum, maintaining the temperature for 10-48 hours, cooling to room temperature, and grinding and crushing to obtain the photoexcitation-free temperature sensing material.

As a further improvement, the raw materials of the compounds containing element Sr and M are each selected from their carbonates or oxides.

As a further improvement, the raw material of the compound containing element Zn is selected from its sulfides.

As a further improvement, the raw materials of the compounds containing element Tb and Eu are each selected from their oxides, fluorides, nitrates, or carbonates.

As a further improvement, the mass fraction of the sintering flux $Li_2CO_3$ in the mixed raw material is 1-10%.

A temperature sensing method uses the photoexcitation-free temperature sensing material with a general chemical formula of $(Sr_xM_{1-x})_{1-y-z}ZnSO:Tb_y,Eu_z$, where $0 \leq x \leq 1$, $0 < y < 1$, $0 < z < 1$, and $y+z < 1$; x, y, and z represent a molar percentage; M represents a substitution ion of Sr and is one or two selected from $Ca^{2+}$ and $Ba^{2+}$. The photoexcitation-free temperature sensing material is applied with mechanical action to produce mechanoluminescence, and the ambient temperature is determined by measuring the ratio of the mechanoluminescence intensity in the waveband of 544 nm of the material to the mechanoluminescence intensity in the waveband of 625 nm of the material.

As a further improvement, the photoexcitation-free temperature sensing material is applicable in a form of powder particles or composite films, and the composite films are fabricated by mixing the powder particles with one of polymethyl methacrylate, polydimethylsiloxane, and epoxy resin.

The present application has following advantages:

The photoexcitation-free temperature sensing material of the present application does not need to be excited by an external light source, can effectively reduce fluorescent background noise, and improve the sensitivity of temperature sensing. The structure of a sensing device can be significantly simplified due to removal of light source, and thus the sensing device is suitable for scenes where an external light source cannot be equipped, thereby greatly expanding the application range of the fluorescence ratio-type temperature sensing method.

The photoexcitation-free temperature sensing material of the present application is a mechanoluminescence material, and the ratio of the mechanoluminescence intensity in the waveband of 544 nm of the material to the mechanoluminescence intensity in the waveband of 625 nm of the material has an exponential function relationship with the ambient temperature, thus having a temperature sensing function in the range from 25° C. to 550° C. and can be widely applied in the field of temperature sensing.

BRIEF DESCRIPTION OF THE DRAWINGS

In order to illustrate the technical solutions of the embodiments of the present application more clearly, the accompanying drawings used in the embodiments will be briefly introduced below. It should be understood that the following drawings only show some embodiments of the present application and thus should not be regarded as a limitation on the scope. Those skilled in the art can also obtain other related drawings based on these drawings without creative work.

DETAILED DESCRIPTION OF THE EMBODIMENTS

In order to make the objectives, technical solutions, and advantages of the embodiments of the present application clearer, the technical solutions in the embodiments of the present application will be clearly and completely described below in conjunction with the accompanying drawings in the embodiments of the present application. Obviously, the described embodiments are a part of embodiments of the present application, rather than all embodiments. Based on the embodiments in the present application, all other embodiments obtained by one of ordinary skill in the art without creative efforts fall within the protection scope of the present application. Accordingly, the following detailed description of the embodiments of the present application provided in the accompanying drawings is not intended to limit the scope of the claimed application, but merely represents selected embodiments of the present application. Based on the embodiments in the present application, all other embodiments obtained by one of ordinary skill in the art without creative efforts fall within the protection scope of the present application.

Definitions and General Terms

It should be further noted that certain features of the present application, for clarity, have been described in multiple separate embodiments, which may also be provided in combination in a single embodiment. Conversely, various features of the present application, for brevity, have been described in a single embodiment, which may also be provided separately or in any suitable subcombination.

Unless otherwise specified, all technical and scientific terms used in the present application have the same meaning as commonly understood by those skilled in the art to which the present application belongs.

Unless otherwise stated or obvious conflict, the articles "a", "an", and "the" used in the present application are intended to include "at least one" or "one or more". Therefore, as used herein, these articles refer to articles of one or more (i.e., at least one) objects. For example, "a component" refers to one or more components, namely, there may be more than one component contemplated to be employed or used in the implementation of the described embodiment.

The terms "comprising" and "including" are both open expressions, which include the contents specified in the present application but do not exclude other aspects.

The term "mechanoluminescence" used in the present application is a phenomenon in which luminescence occurs under mechanical action. Since mechanoluminescence materials can produce real-time photon emission in response to non-destructive mechanical action and the mechanoluminescence intensity is linearly related to the magnitude of stress, they have been widely concerned and applied in the field of mechanical sensing. For instance, non-patent document 2 (Linsheng Liu, Chao-Nan Xu, Akihito Yoshida, Dong Tu, Naohiro Ueno, Shigenobu Kainuma, Scalable elasticoluminescent strain sensor for precise dynamic stress imaging and onsite infrastructure diagnosis, Advanced Materials Technology, 2018, Vol. 4, No. 1, 1800336) reports the real-time dynamic stress distribution detection and micro-crack monitoring of bridge bearing structures based on the sensitive mechanoluminescent property of $SrAl_2O_4$: $Eu^{2+}$. Patent document 3 (Zhang Juncheng, Piezoelectric elastic mechanoluminescence material and preparation method thereof, CN102634335A) discloses a mechanoluminescence material with the expression of $(Ca_{1-x}M_x)(Zn_{1-y}N_y)_{1-a}OS:(Mn_{1-z}R_z)_a$, where M is at least one selected from $Mg^{2+}$, $Sr^{2+}$, and $Ba^{2+}$; N is one or two selected from $Mg^{2+}$ and $Al^{3+}$; and R is selected from transition metals or rare earth sensitizer ions. The material can produce red mechanoluminescence derived from $Mn^{2+}$ under mechanical action such as friction, compression, and ultrasound, which is thus expected to be used for stress sensing. At present, elastic mechanoluminescence materials including $SrAl_2O_4$ and CaZnOS only focus on the field of stress detection. According to the currently published literatures, such materials are impossible to be used in temperature sensing.

A photoexcitation-free temperature sensing material provided in the embodiment of the present application has a general chemical formula of $(Sr_xM_{1-x})_{1-y-z}ZnSO:Tb_y,Eu_z$, where $0 \leq x \leq 1$, $0 < y < 1$, $0 < z < 1$, and $y+z<1$; x, y, and z represent molar percentages; M represents a substitution ion of Sr and is one or two selected from $Ca^{2+}$ and $Ba^{2+}$. The ranges of x, y, and z are the maximum ranges for synthesizing pure phases. If x, y, and z are not in these ranges, the synthesized substances do not have temperature sensing function and are not the required phases.

As a further improvement, $0<y \leq 0.1$ and $0<z \leq 0.1$. When y and z are in these ranges, the sample has higher mechanoluminescence intensity. When y and z are not in these ranges, the sample still produces mechanoluminescence and has temperature sensing function, but the intensity decreases significantly.

As a further improvement, the photoexcitation-free temperature sensing material is a mechanoluminescence material, and the ratio of the mechanoluminescence intensity in the waveband of 544 nm of the material to the mechanoluminescence intensity in the waveband of 625 nm of the material has an exponential function relationship with the ambient temperature. The above-mentioned photoexcitation-free temperature sensing material is applied with certain mechanical action to produce mechanoluminescence, and the ambient temperature can be determined by measuring the ratio of the mechanoluminescence intensity in the waveband of 544 nm of the material to the mechanoluminescence intensity in the waveband of 625 nm of the material, which does not require an external light source for excitation, can effectively reduce fluorescent background noise, and improve temperature sensing sensitivity. The structure of a sensing device can be significantly simplified due to the removal of light source, and thus the device is suitable for scenes where an external light source cannot be equipped, thereby greatly expanding the application range of the fluorescence ratio-type temperature sensing method.

A preparation method for the above-mentioned photoexcitation-free temperature sensing material, including the following steps:

S1, selecting raw materials of compounds each containing one of element Sr, M, Zn, Tb, and Eu, weighing the raw materials according to a stoichiometric ratio of each of the element, adding a sintering flux $Li_2CO_3$, and thoroughly grinding to obtain a mixed raw material; wherein the stoichiometric ratio of the elements refers to the stoichiometric ratio of the elements in the general chemical formula of $(Sr_xM_{1-x})_{1-y-z}ZnSO:Tb_y,Eu_z$, $0 \leq x \leq 1$, $0<y<1$, $0<z<1$, $y+z<1$, and x, y, and z represents molar percentages;

S2, heating the mixed raw material to 800-1200° C. in an inert atmosphere or under vacuum, maintaining the temperature for 10-48 hours, cooling to room temperature, and grinding and crushing to obtain the photoexcitation-free temperature sensing material. The reaction temperature and reaction time are very critical. If the temperature falls outside this range, the target pure phase cannot be obtained. If the time for maintaining the temperature is too short, the pure phase cannot be obtained. If the time for maintaining the temperature is too long, the target phase will decompose.

The photoexcitation-free temperature sensing material of the present application is prepared by a traditional solid-state reaction method, which involves a simple process, a low requirement for equipment, an easy control of conditions, and a low cost, does not produce toxic and harmful substances, and is environment-friendly.

As a further improvement, the raw materials of the compounds containing element Sr and M are each selected from their carbonates or oxides. The raw material of the compound containing element Zn is selected from its sulfides. The target phase contains oxygen and sulfur, and thus the raw materials to be selected should be compounds containing these two anion elements. Carbonates are decomposed into oxides at high temperatures. The raw materials of the compounds containing element Tb and Eu are each selected from their oxides, fluorides, nitrates, or carbonates. If fewer rare earth ions are contained, using fluorides and nitrates can also yield the pure phase. If these compounds are not used, the target pure phase will not be obtained.

As a further improvement, the mass fraction of the sintering flux $Li_2CO_3$ in the mixed raw material is 1-10%. The sintering flux forms a liquid phase at high temperatures, which accelerates the element diffusion rate in a solid-state reaction, thereby advancing the reaction process and obtaining a uniform phase.

As a further improvement, the inert atmosphere is a pure nitrogen atmosphere or a pure argon atmosphere.

A temperature sensing method uses the photoexcitation-free temperature sensing material with a general chemical formula of $(Sr_xM_{1-x})_{1-y-z}ZnSO:Tb_y,Eu_z$, where $0 \leq x \leq 1$, $0 < y < 1$, $0 < z < 1$, and $y+z < 1$, x, y, and z represent molar percentages; M represents a substitution ion of Sr and is one or two selected from $Ca^{2+}$ and $Ba^{2+}$. The photoexcitation-free temperature sensing material is applied with certain mechanical action to produce mechanoluminescence, and the ambient temperature is determined by measuring the ratio of the mechanoluminescence intensity in the waveband of 544 nm of the material to the mechanoluminescence intensity in the waveband of 625 nm of the material.

As a further improvement, the photoexcitation-free temperature sensing material is used in a form of powder particles or composite films fabricated by mixing the powder particles with one of polymethyl methacrylate (PMMA), polydimethylsiloxane (PDMS), and epoxy resin. The mass ratio of the powder particles to the PMMA, the PDMS, or the epoxy resin ranges from 0.1:1 to 10:1. The above three organic matters are commonly used organic elastomer materials and have good transparency and mechanical strength. In the present embodiment, an elastic composite film is obtained by mixing organic elastomers with powder particles and curing, which has been confirmed to have stronger mechanoluminescence. The ratio of powder particles to organic matters should be 0.1:1 to 10:1. If it is lower than 0.1:1, the luminescence intensity is too low, and if it is higher than 10:1, the film cannot be formed.

In the temperature sensing method of the present application, the mechanical action applied to the photoexcitation-free temperature sensing material does not damage the material structure, and the temperature sensing can be cyclically performed.

Embodiment 1

Strontium carbonate, zinc sulfide, europium oxide, and terbium carbonate are selected as raw materials, and the raw materials are weighed according to the molar ratio of the elements (as shown in Table 1). The above raw materials are put into an agate mortar, followed by adding a sintering flux $Li_2CO_3$ at the amount of 1% of the total mass of the raw materials, grinding, and thoroughly mixing. Subsequently, an appropriate amount of the sample is taken and put into a corundum crucible, followed by putting the crucible into a corundum boat, transporting the corundum boat into a tube furnace, heating to 1050° C. under a pure argon inert atmosphere and maintaining for 8 hours, and naturally cooling along with the furnace. The cooled sample is grounded for 20 minutes to obtain a material with stress and temperature sensing functions.

Embodiment 2

A composite film is prepared by a blade coating method. A PMMA colloidal solution is added to $Sr_{0.97}ZnSO:Tb_{0.02}$, $Eu_{0.01}$ powder (#3) for thorough mixing to form a slurry. A transparent flexible polyvinylchlorid (PVC) film (50 mm 50 mm 2 mm) is used as a substrate to carry the composite film. Four layers of transparent tapes (a total thickness of 0.18 mm) are adhered along two edges of the PVC substrate. The mixed composite slurry is poured onto the substrate and scraped with a blade along the transparent tapes, followed by curing in the air at 60° C. for 10 hours to form the composite film.

TABLE 1

Ratios of samples (#1, #2, #3) in Embodiment 1 and composition of composite film (#4) in Embodiment 2

| No. | Sample component | Raw material (g) | Form of material |
|---|---|---|---|
| #1 | $Sr_{0.985}ZnSO:Tb_{0.005}$, $Eu_{0.01}$ | $M(SrCO_3)$ = 2.9083<br>$M(ZnS)$ = 1.949<br>$M(Tb_2(CO_3)_3)$ = 0.0249<br>$M(Eu_2O_3)$ = 0.352 | Powder particles |
| #2 | $Sr_{0.98}ZnSO:Tb_{0.01}$, $Eu_{0.01}$ | $M(SrCO_3)$ = 2.8935<br>$M(ZnS)$ = 1.949<br>$M(Tb_2(CO_3)_3)$ = 0.0498<br>$M(Eu_2O_3)$ = 0.352 | Powder particles |
| #3 | $Sr_{0.97}ZnSO:Tb_{0.02}$, $Eu_{0.01}$ | $M(SrCO_3)$ = 2.8640<br>$M(ZnS)$ = 1.949<br>$M(Tb_2(CO_3)_3)$ = 0.0996<br>$M(Eu_2O_3)$ = 0.352 | Powder particles |
| #4 | PMMA + $Sr_{0.97}ZnSO:Tb_{0.02}$, $Eu_{0.01}$ | PMMA = 0.4 g<br>$Sr_{0.97}ZnSO:Tb_{0.02}$, $Eu_{0.01}$ = 0.4 g | Composite film |

Figure 1:
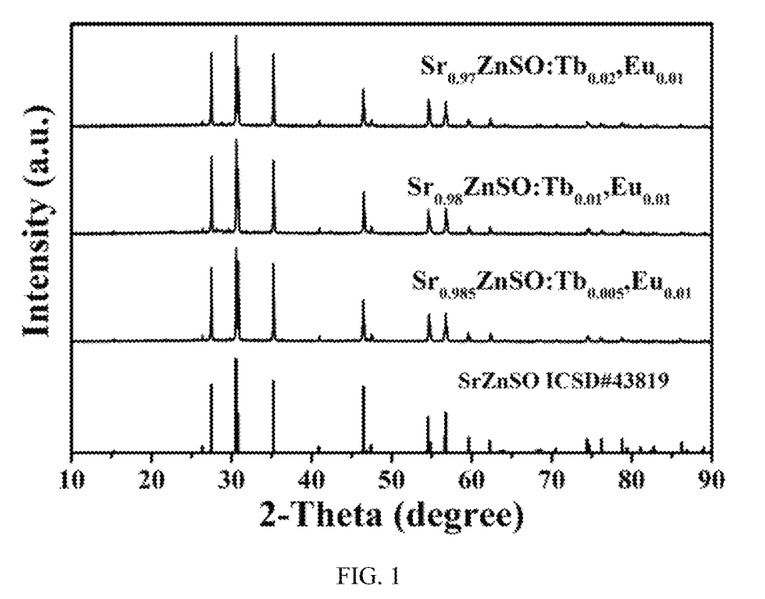
FIG. 1 is an X-ray diffraction spectrum of the sample powder prepared in Embodiment 1 of the present application.

FIG. 1 is an X-ray diffraction spectrum of the sample prepared in Embodiment 1, which is measured by a Bruker d8-advance X-ray diffractometer at a test voltage of 40 kV and a test current of 40 mA and using Cu-Kα rays with a wavelength of λ=1.5406 Å. X-ray diffraction analysis shows that the pure SrZnSO phase can be obtained by calcining the sample at 1050° C. for 8 hours, which belongs to the hexagonal crystal system. The doping of rare earth ions Tb and Eu has no effect on the formation of crystal phase, and no other impurity phases are observed.

Figure 2:
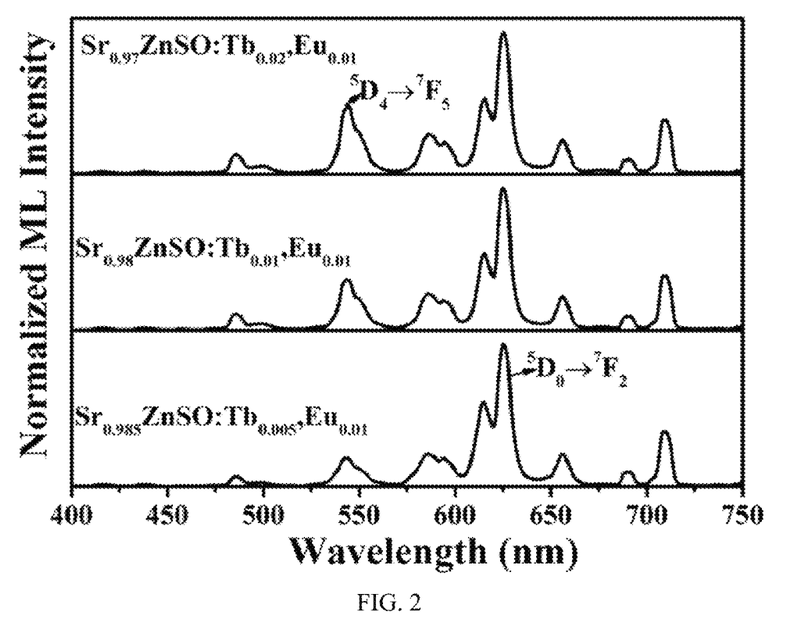
FIG. 2 is a mechanoluminescence spectrum of the sample prepared in Embodiment 1 of the present application under stress.

FIG. 2 is a mechanoluminescence spectrum of the sample prepared in Embodiment 1. The sample powder is put into an agate mortar, and a glass rod is used to rub the samples to produce luminescence. The Ocean Optics fiber optic spectrometer QE pro is used to collect the luminescence of the samples separately, and the data acquisition integration time is 1 second. As shown in FIG. 2, the samples all exhibit mechanoluminescence present in a line spectrum, where the luminescence in the main waveband of 544 nm comes from the transition of $Tb^{3+}$ electrons from $^5D_4$ to $^7F_5$, and the luminescence in the waveband of 625 nm comes from the transition of $Eu^{3+}$ electrons from $^5D_0$ to $^7F_2$.

Figure 3:
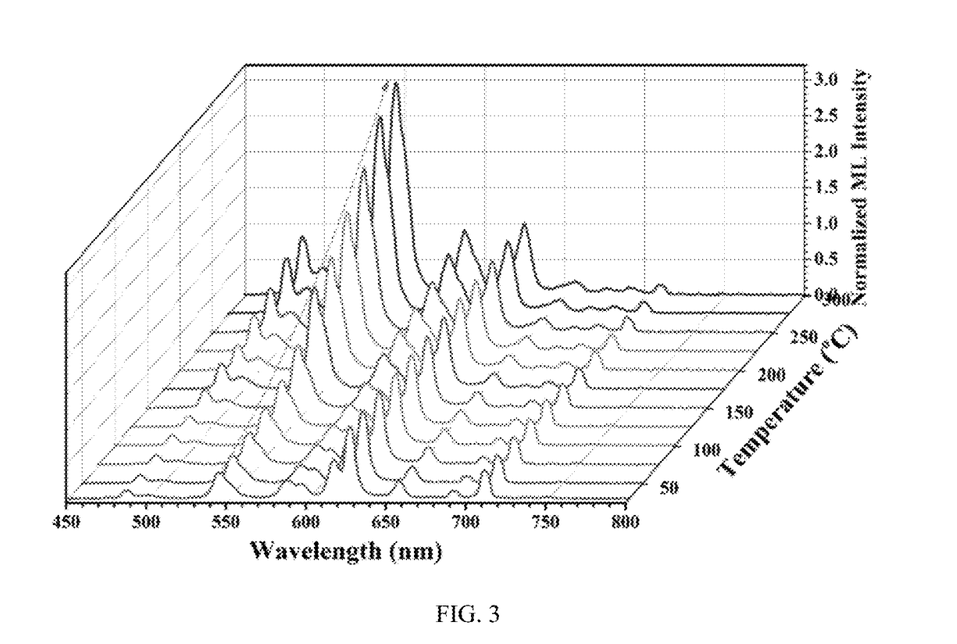
FIG. 3 shows the effect of the temperature of sample #2 prepared in Embodiment 1 of the present application on the mechanoluminescence spectrum.

FIG. 3 shows the change in the mechanoluminescence spectrum of the sample #2 in Embodiment 1 at different temperatures, and the spectrum is normalized based on the intensity at 625 nm. As the temperature increases, the luminescence in the waveband of 544 nm gradually increases.

Figure 4:
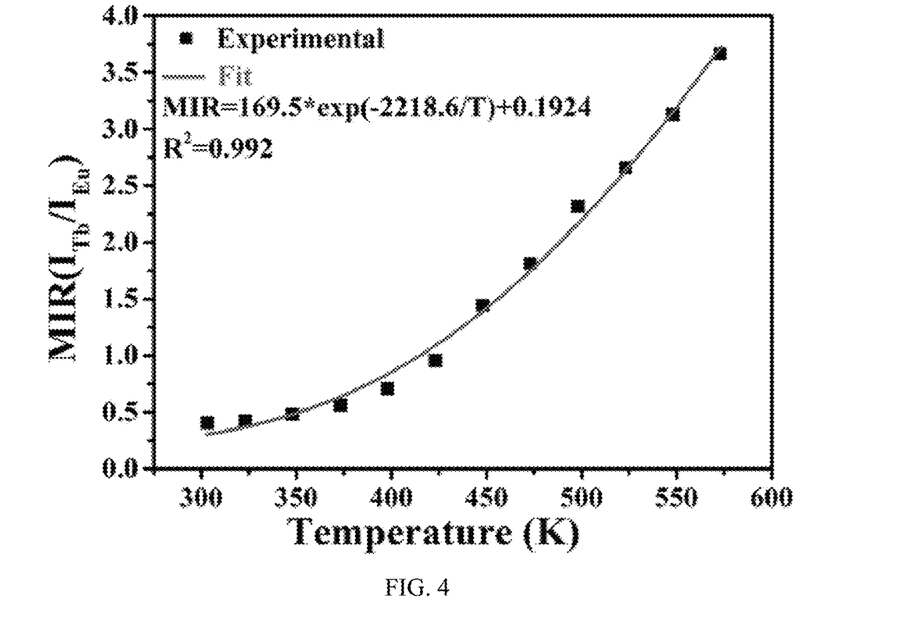
FIG. 4 is a fitted curve showing the relationship between the ratio of the mechanoluminescence intensity of sample #2 prepared in Embodiment 1 of the present application in the waveband of 544 nm to that in the waveband of 625 nm and the temperature.

FIG. 4 is a fitted curve showing the relationship between the ratio of the mechanoluminescence intensity of sample #2 prepared in Embodiment 1 in the waveband of 544 nm to that in the waveband of 625 nm and the temperature. The goodness of fit $R^2$=0.998, indicating that the ratio and the temperature have a good exponential relationship and the sample #2 has temperature sensing function.

Figure 5:
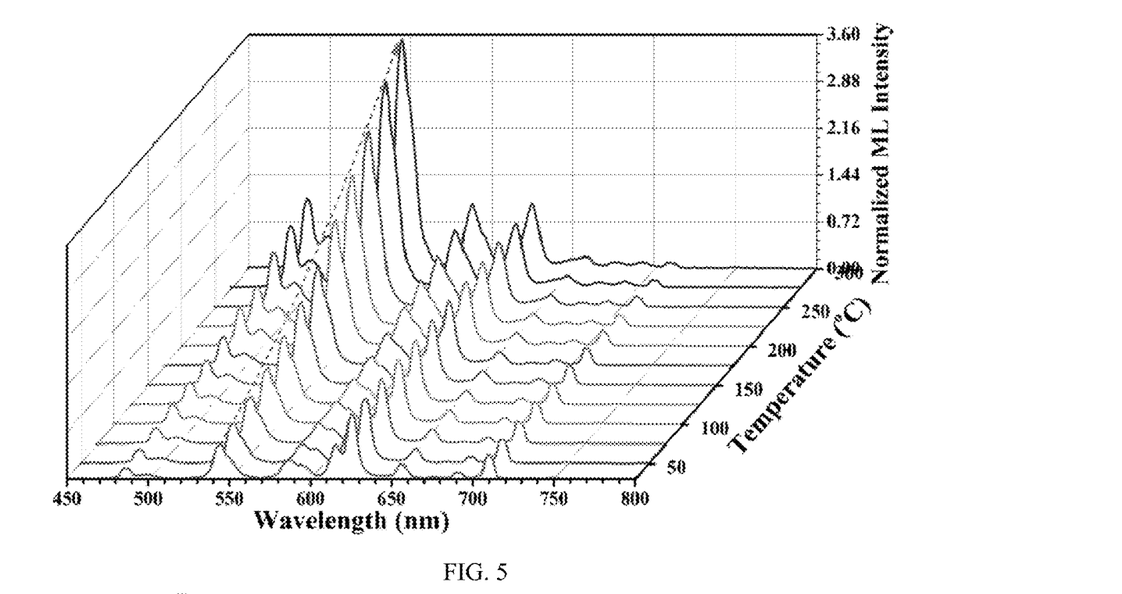
FIG. 5 shows the effect of the temperature of sample #3 prepared in Embodiment 1 of the present application on the mechanoluminescence spectrum.

FIG. 5 shows the change in the mechanoluminescence spectrum of the sample #3 in Embodiment 1 at different temperatures, and the spectrum is normalized based on the intensity at 625 nm. As the temperature increases, the luminescence in the waveband of 544 nm gradually increases.

Figure 6:
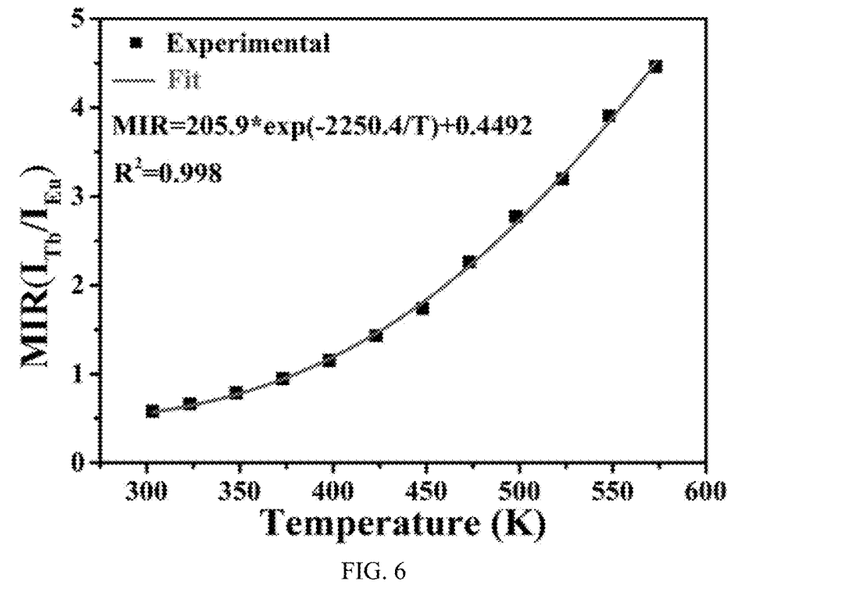
FIG. 6 is a fitted curve showing the relationship between the ratio of the mechanoluminescence intensity of sample #3 prepared in Embodiment 1 of the present application in the waveband of 544 nm to that in the waveband of 625 nm and the temperature.

FIG. 6 is a fitted curve showing the relationship between the ratio of the mechanoluminescence intensity of sample #3 prepared in Embodiment 1 in the waveband of 544 nm to that in the waveband of 625 nm and the temperature. The goodness of fit $R^2$=0.998, indicating that the ratio and the temperature have a good exponential relationship and the sample #3 has temperature sensing function.

Figure 7:
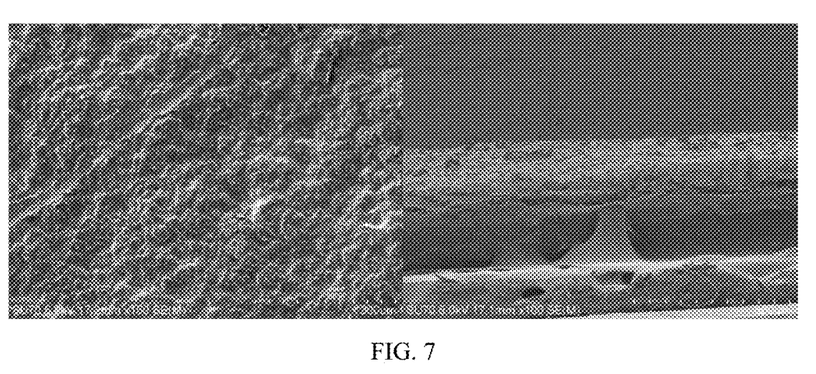
FIG. 7 is a scanning electron microscope image of the composite film prepared in Embodiment 2 of the present application.

FIG. 7 is a scanning electron microscope image of the composite film prepared in Embodiment 2. The left image is the surface microtopography of the composite film, and the right image is the microtopography of the cross-section of the composite film.

Figure 8:
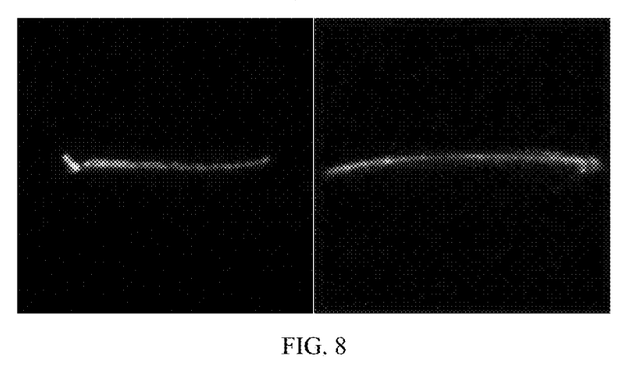
FIG. 8 is an image showing the mechanoluminescence of the composite film prepared in Embodiment 2 of the present application at 25° C. and 150° C.

FIG. 8 is an image of mechanoluminescence of the composite film prepared in Embodiment 2 at 25° C. and 150° C. At 25° C., the composite film produces orange luminescence. As the temperature gradually increases, green luminescence gradually appears. At 150° C., the film presents green luminescence. The composite film can judge the temperature based on the color of luminescence, thus realizing the visualization of temperature.

Embodiment 3

Strontium carbonate, calcium carbonate or barium carbonate, zinc sulfide, europium oxide, and terbium carbonate are selected as raw materials, and the raw materials are weighed according to the molar ratio of the elements (as shown in Table 2). The above raw materials are put into an agate mortar, followed by adding a sintering flux $Li_2CO_3$ at the amount of 1% of the total mass of the raw materials, grinding, and thoroughly mixing. Subsequently, an appropriate amount of the sample is taken and put into a corundum crucible, followed by putting the crucible into a corundum boat, transporting the corundum boat into a tube furnace, heating to 1000° C. under a pure argon inert atmosphere and maintaining for 8 hours, and naturally cooling along with the furnace. The cooled sample is ground for 20 minutes to obtain a mechanoluminescence material. As long as they are the same phase, mechanoluminescence will be produced. Similarly, doping two elements will result in double peaks. The intensity of the double peaks is related to temperature, therefore, temperature sensing can be realized without a light source.

TABLE 2

Ratios of samples (#5 and #6) in Embodiment 3

| No. | Sample component | Raw material (g) | Form of material |
|---|---|---|---|
| #5 | $Sr_{0.885}Ca_{0.1}ZnSO:Tb_{0.005},Eu_{0.01}$ | $M(SrCO_3) = 2.6130$<br>$M(CaCO_3) = 0.2002$<br>$M(ZnS) = 1.949$<br>$M(Tb_2(CO_3)_3) = 0.0249$<br>$M(Eu_2O_3) = 0.352$ | Powder particles |
| #6 | $Sr_{0.95}Ba_{0.1}ZnSO:Tb_{0.005},Eu_{0.01}$ | $M(SrCO_3) = 2.6130$<br>$M(BaCO_3) = 0.3947$<br>$M(ZnS) = 1.949$<br>$M(Tb_2(CO_3)_3) = 0.0498$<br>$M(Eu_2O_3) = 0.352$ | Powder particles |

INDUSTRIAL PRACTICALITY

The temperature sensing material of the present application does not need to be excited by an external light source, can effectively reduce fluorescent background noise, and improve temperature sensing sensitivity. The structure of a sensing device can be significantly simplified due to the removal of light source, and thus the device is suitable for scenes where an external light source cannot be equipped, thereby greatly expanding the application range of the fluorescence ratio-type temperature sensing method, showing good application potential in industry, and possessing industrial practicality.

The above descriptions are only preferred embodiments of the present application and are not intended to limit the present application. For those skilled in the art, the present application may have various modifications and changes. Any modifications, equivalent replacements, improvements, etc. made within the spirit and principles of the present application shall be included within the protection scope of the present application.

What is claimed is:

1. A photoexcitation-free temperature sensing material, comprising a general chemical formula of $(Sr_xM_{1-x})_{1-y-z}ZnSO:Tb_y,Eu_z$, wherein 0≤x≤1, 0<y≤1, 0<z≤1, and y+z≤1; x, y, and z represent molar percentages; M represents a substitution ion of Sr and is one or two selected from $Ca^{2+}$ and $Ba^{2+}$.

2. The photoexcitation-free temperature sensing material according to claim 1, wherein 0<y≤0.1 and 0<z≤0.1.

3. The photoexcitation-free temperature sensing material according to claim 1, wherein the photoexcitation-free temperature sensing material is a mechanoluminescence material, and a ratio of a mechanoluminescence intensity in a waveband of 544 nm of the material to a mechanoluminescence intensity in a waveband of 625 nm of the material has an exponential function relationship with an ambient temperature.

4. A preparation method for a photoexcitation-free temperature sensing material, comprising following steps:
S1, selecting raw materials of compounds each containing one of element Sr, M, Zn, Tb, and Eu, weighing the raw materials according to a stoichiometric ratio of each of the element, adding a sintering flux $Li_2CO_3$, and thoroughly grinding to obtain a mixed raw material; wherein the stoichiometric ratio of the elements refers to the stoichiometric ratio of the elements in the general chemical formula of $(Sr_xM_{1-x})_{1-y-z}ZnSO:Tb_y,Eu_z$, 0≤x≤1, 0<y≤1, 0<z≤1, y+z≤1, and x, y, and z represent a molar percentage;
S2, heating the mixed raw material to 800-1200° C. in an inert atmosphere or under vacuum, maintaining the temperature for 10-48 hours, cooling to room temperature, and grinding and crushing to obtain the photoexcitation-free temperature sensing material.

5. The method according to claim 4, wherein the raw materials of the compounds containing element Sr and M are each selected from carbonates or oxides thereof.

6. The method according to claim 4, wherein the raw material of the compound containing element Zn is selected from sulfides thereof.

7. The method according to claim 4, wherein the raw materials of the compounds containing element Tb and Eu are each selected from oxides, fluorides, nitrates, or carbonates thereof.

8. The method according to claim 4, wherein a mass fraction of the sintering flux $Li_2CO_3$ in the mixed raw material is 1-10%.

9. A temperature sensing method using a photoexcitation-free temperature sensing material with a general chemical formula of $(Sr_xM_{1-x})_{1-y-z}ZnSO:Tb_y,Eu_z$, wherein 0≤x≤1, $0<y\le1$, $0<z\le1$, and $y+z\le1$, x, y, and z represent a molar percentage; M represents a substitution ion of Sr and is one or two selected from $Ca^{2+}$ and $Ba^{2+}$; the photoexcitation-free temperature sensing material is applied with mechanical action to produce mechanoluminescence, and an ambient temperature is determined by measuring a ratio of a mechanoluminescence intensity in a waveband of 544 nm of the material to a mechanoluminescence intensity in a waveband of 625 nm of the material.

10. The temperature sensing method according to claim 9, wherein the photoexcitation-free temperature sensing material is applicable in a form of powder particles or composite films, and the composite films are fabricated by mixing the powder particles with one of polymethyl methacrylate, polydimethylsiloxane, and epoxy resin.

* * * * *